(12) United States Patent
Sandstrom et al.

(10) Patent No.: US 8,800,620 B2
(45) Date of Patent: Aug. 12, 2014

(54) TIRE WITH RUBBER TREAD COMPOSED OF A PRIMARY AND AT LEAST ONE LATERAL TREAD PORTION CONTAINING A DISPERSION OF SHORT CARBON FIBERS

(75) Inventors: Paul Harry Sandstrom, Cuyahoga Falls, OH (US); Walter Kevin Westgate, Uniontown, OH (US); Bina Patel Botts, Cuyahoga Falls, OH (US); Rachel Rebekah Barnette, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 2275 days.

(21) Appl. No.: 11/389,912

(22) Filed: Mar. 27, 2006

(65) Prior Publication Data

US 2007/0221303 A1 Sep. 27, 2007

(51) Int. Cl.
| | |
|---|---|
| *B60C 11/00* | (2006.01) |
| *B60C 1/00* | (2006.01) |
| *B60C 11/14* | (2006.01) |
| *C08K 3/00* | (2006.01) |
| *C08K 7/06* | (2006.01) |
| *C08K 3/04* | (2006.01) |

(52) U.S. Cl.
CPC ........... *B60C 1/0016* (2013.04); *B60C 11/0058* (2013.04); *B60C 11/14* (2013.01); *C08K 3/0033* (2013.01); *C08K 3/04* (2013.01); *C08K 7/06* (2013.01)
USPC ..................... 152/209.4; 152/209.5; 152/212; 152/458

(58) Field of Classification Search
CPC .................................................. B60C 11/0058
USPC ........... 152/209.4, 209.5, 209.8, 209.18, 212; 152/458
See application file for complete search history.

(56) References Cited

U.S. PATENT DOCUMENTS 3,509,018 A * 4/1970 Endter et al. ................... 156/910
3,638,702 A * 2/1972 Endter ........................ 152/209.1
(Continued)

FOREIGN PATENT DOCUMENTS

EP 341187 11/1989 .............. B60C 11/00
EP 662396 7/1995 ................ B60C 1/00
(Continued)

*Primary Examiner* — Steven D Maki
(74) *Attorney, Agent, or Firm* — Henry C. Young, Jr.

(57) ABSTRACT

The invention relates to a tire having a circumferential rubber tread of a cap/base construction composed of a cap rubber layer as the tire running surface and an internal base rubber layer underlying said tread cap layer. The said tread cap layer is composed of a primary tread cap portion and one or two lateral tread cap portions of rubber compositions containing precipitated silica and/or rubber reinforcing carbon black reinforcement and wherein the rubber composition of at least one of said lateral tread cap portions contains a dispersion of short carbon fibers. Said primary tread cap portion contains a major portion of the running surface of the tread and is comprised of a silica-rich or carbon black-rich, preferably silica-rich, reinforcement-containing rubber composition, and said lateral tread portion(s) contains a minor portion of the running surface of the tread and is comprised of a silica-rich or carbon black-rich, preferably carbon black-rich, reinforcement-containing rubber composition. Where said primary tread cap portion is comprised of a silica-rich rubber composition, said lateral tread cap portion(s) is comprised of a carbon black-rich rubber composition and visa versa. The said tread cap portions are load bearing portions in the sense of extending from the running surface of the tread radially inward to said underlying tread base layer. In one aspect, the portioned rubber tread cap layer and the rubber tread base layer are co-extruded together to form a unitary composite thereof.

6 Claims, 1 Drawing Sheet

(56) References Cited

U.S. PATENT DOCUMENTS

| | | | |
|---|---|---|---|
| 3,697,364 A | 10/1972 | Boustany et al. | 161/59 |
| 3,802,478 A | 4/1974 | Boustany et al. | 152/357 |
| 4,236,563 A | 12/1980 | Moers et al. | 152/354 |
| 4,319,620 A | 3/1982 | Knill | 152/209 |
| 4,385,653 A | 5/1983 | Okazaki et al. | 152/209 |
| 5,225,011 A | 7/1993 | Takino et al. | 152/209 |
| 5,323,829 A | 6/1994 | Hubbell et al. | 152/527 |
| 5,591,279 A * | 1/1997 | Midorikawa et al. | 152/209.4 |
| 5,684,082 A * | 11/1997 | Segatta | 524/525 |
| 5,718,781 A * | 2/1998 | Verthe et al. | 152/209.5 |
| 6,077,606 A * | 6/2000 | Gillick et al. | 152/451 |
| 6,302,173 B1 * | 10/2001 | Mizuno et al. | 152/209.4 |
| 6,350,492 B1 | 2/2002 | Gillick et al. | 427/407.1 |
| 6,415,833 B1 | 7/2002 | Komatsu | 152/152.1 |
| 6,474,382 B1 | 11/2002 | Finck | 152/209.5 |
| 6,540,858 B1 | 4/2003 | Caretta et al. | |
| 6,899,782 B1 * | 5/2005 | Chang et al. | 152/209.4 |
| 6,959,744 B2 | 11/2005 | Sandstrom et al. | 152/209.5 |
| 2002/0033212 A1 | 3/2002 | Caretta et al. | 152/209.5 |
| 2002/0069948 A1 * | 6/2002 | Sentmanat | 152/209.4 |
| 2003/0166743 A1 * | 9/2003 | Huynh-Tran et al. | 523/205 |
| 2003/0173010 A1 * | 9/2003 | Ammon | 152/209.4 |
| 2004/0035514 A1 * | 2/2004 | Kikuchi et al. | 152/209.4 |
| 2004/0112490 A1 * | 6/2004 | Sandstrom | 152/209.5 |
| 2005/0167019 A1 | 8/2005 | Puhala et al. | 152/209.5 |

FOREIGN PATENT DOCUMENTS

| | | | | |
|---|---|---|---|---|
| EP | 839675 | | 10/1996 | B60C 19/08 |
| EP | 864446 | | 3/1997 | B60C 11/03 |
| EP | 864446 | * | 9/1998 | |
| EP | 993381 | | 9/2000 | B60C 1/00 |
| EP | 1072446 | * | 1/2001 | |
| EP | 1308319 | | 11/2001 | B60C 11/18 |
| FR | 2765525 | | 1/1999 | B60C 11/00 |
| JP | 57-137137 | * | 8/1982 | |
| JP | 60135309 | | 7/1985 | B60C 11/18 |
| JP | 2001047815 | | 2/2001 | B60C 1/00 |
| JP | 2004-277504 | * | 10/2004 | |
| WO | 9901299 | | 1/1999 | B60C 11/18 |
| WO | 01/17747 | * | 3/2001 | |

* cited by examiner

TIRE WITH RUBBER TREAD COMPOSED OF A PRIMARY AND AT LEAST ONE LATERAL TREAD PORTION CONTAINING A DISPERSION OF SHORT CARBON FIBERS

FIELD OF THE INVENTION

The invention relates to a tire having a circumferential rubber tread of a cap/base construction composed of a cap rubber layer as the tire running surface and an internal base rubber layer underlying said tread cap layer. The said tread cap layer is composed of a primary tread cap portion and one or two lateral tread cap portions of rubber compositions containing precipitated silica and/or rubber reinforcing carbon black reinforcement and wherein the rubber composition of at least one of said lateral tread cap portions contains a dispersion of short carbon fibers. Said primary tread cap portion contains a major portion of the running surface of the tread and is comprised of a silica-rich or carbon black-rich, preferably silica-rich, reinforcement-containing rubber composition, and said lateral tread portion(s) contains a minor portion of the running surface of the tread and is comprised of a silica-rich or carbon black-rich, preferably carbon black-rich, reinforcement-containing rubber composition. Where said primary tread cap portion is comprised of a silica-rich rubber composition, said lateral tread cap portion(s) is comprised of a carbon black-rich rubber composition and visa versa. The said tread cap portions are load bearing portions in the sense of extending from the running surface of the tread radially inward to said underlying tread base layer. In one aspect, the portioned rubber tread cap layer and the rubber tread base layer are co-extruded together to form a unitary composite thereof.

BACKGROUND FOR THE INVENTION

Tire treads for pneumatic tires typically have running surfaces of a singular rubber composition and consistent physical properties across the face of the tread intended to be ground contacting.

Often the tire tread may be of a cap/base construction composed of an outer tread cap layer presenting the running surface of the tire and an underlying tread base layer as a transition between the tread cap layer and the tire carcass. The tread cap layer itself may be of a lug and groove configuration with the outer surface of the lugs, including lugs in a form of ribs, themselves presenting the running surface of the tire tread. Such overall tire tread cap/base construction is well known to those having skill in such art.

For example, an all-season tire tread cap layer may be of an individual rubber composition designed to present a tread running surface for a balance of a combination of wet traction, cold weather winter traction (for snow and/or ice), dry handling, and resistance to tread wear properties.

However, optimizing one or more individual tread properties such as, for example, wet traction, cold weather winter traction, dry handling and resistance to tread wear properties typically requires a compromise of one or more physical properties.

Tires have been heretofore proposed which have circumferentially zoned treads for various purposes including a desire to present a plurality of individual running surfaces with various characteristics from one tire tread. For example, see U.S. Pat. Nos. 4,319,620, 4,385,653, 6,415,833, 6,474,382, 6,540,858 and 6,959,744; U.S. Patent Application Nos. 2002/0033212, 2004/0112490 and 2005/0167019; European Patent Publication Nos. 0341187, 0662396, 0839675 and 1308319; WO99/01299; and Japanese Patent Publication Nos. 2001/047815 and 85/60135309.

For this invention, it is desired to present an outer tread cap layer with a running surface composed of two or three individual circumferential load-bearing portions, namely said primary tread cap portion and said one or two individual lateral tread cap portions.

In one instance, said tread cap layer is composed of two individual circumferential tread zones, or portions, namely said primary tread cap zone and an adjoining outboard lateral tread cap zone.

In another instance, said tread cap layer is composed of three circumferential tread zones, or portions, namely said primary tread cap zone and adjoining individual outboard lateral tread cap zones.

For this invention, a primary circumferential tread cap zone is provided which constitutes at least sixty percent (e.g. from about 60 to about 90 percent) of the axial width of the tread running surface intended to be ground contacting. The remainder of such tread running surface is comprised of said one or two individual lateral circumferential tread cap zone(s) which are individually positioned next to and axially outward from said primary tread cap zone, wherein said lateral circumferential tread cap zones may be of the same or different widths.

Therefore, in one instance, such tread cap may be of an asymmetrical configuration in the sense of the aforesaid primary tread cap zone and one outboard lateral tread cap zone or the aforesaid primary tread cap zone and two individual lateral tread cap zones of unequal widths for the tread running surface. In practice, for the tread cap layer with a single outboard lateral circumferential tread zone, it is intended that the tire is mounted on a rim to form a tire/rim, or wheel, assembly, with said outboard lateral tread cap zone positioned axially outward (away from the vehicle) insofar as the associated vehicle is concerned. Where the tread cap contains two individual lateral tread cap zones, one lateral tread cap zone is to be said outboard lateral tread cap zone and the other is to be an inboard lateral tread cap zone (inboard with respect to the vehicle with which the tire is to be associated). Accordingly, at least one of said lateral tread cap zones is designed to be an outboard lateral tread cap zone in a sense of intended tire orientation on an associated vehicle and in such manner provide an additional (outboard positioned) control element, or zone, to the primary tread cap zone of the tire with the term "outboard" referring to the axial outer position of the lateral tread cap zone of the tire tread.

Accordingly, said asymmetrically configured zoned tread running surface is not composed of a central or other circumferential tread zone centered over the centerline, or equatorial plane, of the tire.

Historically, various discontinuous (non-woven) fibers have also been used, particularly to enhance both stiffness and modulus of rubber vulcanizates. For example, discontinuous cellulose fibers, including such fibers with high aspect ratios, have been used as dispersions thereof in rubber as disclosed for example in U.S. Pat. Nos. 3,697,364, 3,802,478, and 4,236,563.

Various carbon fibers, including short fibers and carbon cords, have been suggested for use in various rubber compositions, including tire treads. For example, see U.S. Pat. Nos. 5,323,829 and 5,718,781. A multi-filament carbon yarn has been suggested for reinforcement of rubber compositions in which the yarn is coated with a composite of resorcinol-formaldehyde reaction product, a vinylpyridine-styrene butadiene terpolymer, an acrylonitrile-butadiene copolymer and urea. For example, see U.S. Pat. Nos. 6,077,606 and 6,350,492.

For this invention, short, discontinuous carbon fibers are used for the rubber reinforcement which have been coated (pre-coated) with an adhesive composition (to aid, or enhance, adhesion of the carbon fibers to the elastomer) comprised of a vinylpyridine-styrene butadiene terpolymer, an acrylonitrile-butadiene copolymer and optionally urea (RFL adhesive coating).

In practice, such carbon fibers are preferably in a form of a cord comprised of twisted (cabled) carbon filaments having a carbon filament count (number of carbon filaments in the cord) preferably within a range of from about 1,000 to about 48,000. The average filament length (cord length) is preferably within a range of from about 1 mm (millimeter) to about 10 mm, optionally in a range of from about 3 mm to about 5 mm and an average diameter within a range of from about 2 to about 15 microns.

Representative of an adhesive coated carbon yarn is a carbon multi-filament yarn impregnated with a resorcinol-formaldehyde-rubber composite. The adhesive coated multi-filament yarn may then chopped into the short yarn fibers for use in this invention.

Such resorcinol-formaldehyde composite may be, for example, comprised of, and the product of, a resorcinol, formaldehyde, vinylpyridine/styrene/butadiene terpolymer latex and acrylonitrile/butadiene copolymer latex blend, which may optionally include urea. After application to and encapsulation of the carbon multi-filament yarn, the blend is dried and cured at an elevated temperature in a sense of allowing the latices to dry and the resorcinol and formaldehyde to react and thereby form a resin within the resultant rubber and to thereby form the resorcinol-formaldehyde resin-rubber composite coated carbon filaments. The resorcinol and formaldehyde react with each other in situ within the latex binder to form an adhesive resin. The rubber copolymer(s), in one aspect, form a resultant binder for the resin. For an example of such coated carbon fibers, see U.S. Pat. No. 6,077,606. For convenience, said adhesive coating may be referred to herein as an RFL (resorcinol-formaldehyde-latex) adhesive coating. If desired, the carbon multi-filament yarn may be pre-treated by impregnating the yarn with an epoxy resin prior to its impregnation with the RFL composite in order to provide enhanced bonding of the filaments to the said RFL composite.

The yarn comprised of the RFL adhesive coated (encapsulated) carbon filaments is then chopped into short filamentary lengths and the coated filaments separated into short fibers, all by suitable means, for blending with and dispersing into the rubber composition.

A representative example of a multi-filament carbon yarn for such RFL treatment, or coating, is, for example, T700GC™ from Toray Industries. In practice, said carbon yarn may contain, for example, a range of from about 1,000 to about 48,000 carbon filaments.

Historically, tire treads have heretofore been suggested having running surfaces composed of three longitudinal portions namely, two black colored lateral portions and a non-black colored central portion located between the two black portions, wherein the lateral black colored portions have wear resistant properties virtually identical to the central colored portion (EP 0 993 381 A3, FR 2765525 and WO 99/01299 patent publications).

In U.S. Pat. No. 5,225,011 a tire is presented having a tread composed of a center rubber composition and side rubbers (its FIG. 1) positioned directly onto a tire carcass belt without a tread base transition layer. The center rubber is required to be limited to either natural rubber or a natural rubber/styrene-butadiene rubber blend. The center rubber contains a carbon black of large iodine absorption number of at least 100 mg/g, silica and silane coupling agent and the side rubbers are required to be of a different rubber composition.

In European patent publication number EP 864,446 A1 a tire is presented having a tread (its FIG. 2) with a central portion (B) and side portions (A) positioned directly onto a tire carcass belt without a tread base transition layer. The side portions are carbon black rich and the central portion is silica rich, wherein the silica content of the central portion (B) is at least 20 percent higher than in the side portions (A).

For the zoned tread cap layer of this invention, by requiring the tread cap zones to be capable of being load-bearing, it is meant that each of the distinct tread running surface tread cap zones extend radially inward from the outer surface of the tread cap layer to the underlying tread base layer rubber composition so that the load on the tire may be communicated by the tread cap layer zones to the transitional tread base layer instead of directly to the remainder of the tire carcass itself.

The term "running surface", or "total running surface", of the tread cap layer, unless otherwise indicated, means the total outer surface of such tread cap layer which is intended to be ground-contacting, including such outer surface of the tread cap layer which is intended to be intermittently ground-contacting and the included space, or span, across the opening of any tread grooves contained in such tread cap layer at the running surface level. When a tread cap zone is referenced herein as spanning a percentage of total running surface of the tread cap, unless otherwise indicated, such span extends axially, or laterally, across such running surface (e.g. basically, in a direction substantially perpendicular to the equatorial plane (EP) of the tire).

In the description of this invention, the terms "rubber" and "elastomer" may be used interchangeably, unless otherwise provided. The terms "rubber composition", "compounded rubber" and "rubber compound" may be used interchangeably to refer to "rubber which has been blended or mixed with various ingredients and materials" and such terms are well known to those having skill in the rubber mixing or rubber compounding art. The terms "cure" and "vulcanize" may be used interchangeably unless otherwise provided: In the description of this invention, the term "phr" refers to parts of a respective material per 100 parts by weight of rubber, or elastomer.

SUMMARY AND PRACTICE OF THE INVENTION

In accordance with this invention, a tire is provided having a rubber tread of a cap/base construction comprised of an outer rubber tread cap layer containing an outer running surface and preferably an underlying internal rubber tread base layer, wherein said tread cap layer is comprised of a plurality of circumferential, longitudinal rubber tread cap zones, wherein said tread cap zones individually extend from said tread cap running surface radially inward to said tread base layer:

wherein said tread cap zones are comprised of:
(A) a primary tread cap zone, and
(B) a lateral outboard tread cap zone axially adjacent to said primary tread cap zone, or
(C) two spaced apart lateral tread cap zones, wherein each lateral tread cap zone is individually respectively positioned axially adjacent to each side of said primary tread cap zone;

wherein said primary tread cap zone spans from about 60 to about 90 percent of the axial width of the total running surface of said tire tread cap layer, and wherein said lateral tread cap zone(s) spans the remaining axial width of the total running surface of said tire tread cap layer;

wherein said primary tread cap zone is of a rubber composition comprised of:
(1) at least one conjugated diene-based elastomer, and
(2) about 30 to about 130 phr of reinforcing filler comprised of:
   (a) rubber reinforcing carbon black, or
   (b) about 10 to about 120 phr of precipitated silica and up to about 120 phr of rubber reinforcing carbon black, and
(3) optionally, a coupling agent having a moiety reactive with hydroxyl groups (e.g. silanol groups) contained on the surface of said silica and aldehyde groups contained on the surface of said rubber reinforcing carbon black and another different moiety interactive with said diene-based elastomer;

wherein said lateral tread cap zone or zones are of the same or different rubber compositions comprised of:
(4) at least one conjugated diene-based elastomer,
(5) about 0.1 to about 15 phr of a dispersion therein of adhesive coated short carbon fibers, and
(6) about 20 to about 100 phr of reinforcing filler comprised of:
   (a) rubber reinforcing carbon black, or
   (b) about 10 to about 100 phr of precipitated silica and up to about 90 phr of rubber reinforcing carbon black;
(7) optionally, a coupling agent having a moiety reactive with hydroxyl groups (e.g. silanol groups) contained on the surface of said silica and aldehyde groups contained on the surface of said rubber reinforcing carbon black and another different moiety interactive with said diene-based elastomer;

wherein said short carbon fibers have an average length within a range of from about 1 to about 10 millimeters, alternately within a range of from about 3 to about 5 millimeters, and an average diameter within a range of from about 2 to about 15 microns;

wherein said carbon fibers have a coating thereon comprised of wherein said carbon fibers have an RFL adhesive coating thereon comprised of a resorcinol-formaldehyde resin and polymeric binder.

As hereinbefore discussed, such RFL adhesive, as is well known to those having skill in such art, and as further discussed in the aforesaid U.S. Pat. No. 6,077,606, may be, for example a resorcinol-formaldehyde composite as a resinous product of resorcinol and formaldehyde together with a vinylpyridine/styrene/butadiene terpolymer (from a latex thereof) and acrylonitrile/butadiene copolymer (from a latex thereof) blend, which may optionally include urea. As also hereinbefore discussed, the carbon fibers may optionally be impregnated with an epoxy prior to coating with said RFL adhesive composite.

In further addition to the invention, the rubber composition of at least one of said lateral tread cap zones which contain said adhesive (RFL) coated carbon fibers may contain an in situ formed resin as the product of a methylene donor and methylene acceptor (e.g. resorcinol and hexamethoxymethyl melamine).

In practice, the RFL coated carbon fibers and methylene donor are preferably mixed with the rubber composition prior to mixing the methylene acceptor upon which the methylene donor/methylene acceptor resin is formed in situ within the rubber composition in the presence of the RFL adhesive coated carbon fiber dispersion.

Representative of various methylene donor compounds are, for example, methylene donor compounds comprised of at least one of hexamethoxymethylmelamine, hexamethylenetetramine, methoxymethyl melamine, N,N'N"-trimethyl N,N'N"-trimethylolmelamine, hexamethylomelamine, N,N'N"-dimethylolmelamine, N-methylolmelamine, N,N'-dimethylolmelamine, N,N'N"-tris(methoxymethyl) melamine, N,N'N"-tributyl-N,N'N"-trimethyloi-melamine and hexaethoxymethylmelamine, preferably hexamethoxymethylmelamine.

The amount of the methylene donor compound in the rubber composition may vary. For example, it may be contained, as a component of said resinous reaction product of methylene donor and methylene acceptor, in the rubber composition in an amount in a range of from about 0.5 to about 4 phr.

Representative of various methylene acceptor compounds are, for example, methylene acceptor compounds comprised of at least one of resorcinol, resorcinolic derivatives, monohydric phenols and derivatives thereof, dihydric phenols and derivatives thereof, polyhydric phenols and derivatives thereof, unmodified phenol novolak resins, modified phenol novolak resin, novolak resins, particularly resorcinol.

The term "methylene acceptor" is known to those having skill in such art and is used to describe the reactant, or compound with which the methylene donor compound reacts to form what is believed to be an intermediate methylol monomer. It is envisioned that a condensation of the intermediate methylol monomer by formation of a methylene bridge produces a resin material. The initial reactant for which it is envisioned contributes the moiety that later forms the methylene bridge and ultimately the resin is referred to as being the methylene donor compound and the other reactant is referred to as being the methylene acceptor compound. Examples of methylene acceptors are indicated above and include, for example, but are not limited to those disclosed in U.S. Pat. Nos. 6,605,670, 6,472,457, 5,945,500, 5,936,056, 5,688,871, 5,665,799, 5,504,127, 5,405,897, 5,244,725, 5,206,389, 5,194,513, 5,030,692, 4,889,481, 4,605,696, 4,436,853 and 4,092,455. Examples of modified novolak resins include, for example, but are not limited to, cashew nut oil (e.g. cashew nut shell oil) modified phenol novolak resin, tall oil modified phenol novolak resin and alkyl modified phenol novolak resin such as, for example, SP6700™. In one embodiment, the methylene acceptor compound is resorcinol.

The amount of methylene acceptor compound in the rubber composition may vary, depending somewhat upon selection and amount of methylene donor compound used as well as the selection of the methylene acceptor compound itself and a desired ratio of methylene donor compound to methylene acceptor compound. For example, the amount of methylene acceptor compound, as a component of said resinous reaction product of said methylene donor and methylene acceptor, may be in a range of from about 0.5 to about 5, alternatively from about 1 to about 3 phr.

A weight ratio of the methylene acceptor compound to methylene donor compound may range, for example, from about 5/1 to about 1/5.

The rubber composition of at least one of said lateral tread cap zone and/or said lateral tread cap zones, may optionally contain a coupling agent having a moiety reactive with hydroxyl groups contained on the surface of said precipitated silica (where the precipitated silica is used and contained in the respective rubber composition) and aldehyde groups contained on the surface of said rubber reinforcing carbon black and another different moiety interactive with said diene-based elastomer.

In practice, the said primary tread cap zone preferably occupies greater than 50, preferably at least 60 up to about 90, percent of the free running surface of the tread and the said lateral tread cap zone(s) occupy(ies) at least 10 percent of the free running surface of the tread.

For this invention, the term "outboard" lateral tread cap zone refers to that portion of the tire tread, when the tire is mounted on a rim to form a tire/rim, or wheel, assembly, for an associated vehicle which is intended to be positioned axially outward, or outboard, insofar as the associated vehicle is concerned and therefore is referred to herein as an outboard lateral tread cap zone.

In practice, the adhesive coating on the carbon fibers is preferably the aforesaid resorcinol-formaldehyde resin composite of resorcinol-formaldehyde resin, which may also optionally contain urea, in the said copolymer rubber binder.

In practice, said short carbon fibers may be significantly aligned (e.g. from about 20 to about 80 percent, or more, aligned which is considered herein to be significantly aligned on a relative basis, namely as compared to being randomly dispersed and not aligned altogether) with each other in the direction of the flow of the rubber composition by a contraction extrusion of the rubber composition (extrusion of the uncured rubber composition) through a suitable shaping die. By contraction extrusion, it is meant that the volumetric flow of the rubber composition extruded through a shaping die is contracted (e.g. by a reduction of the cross-section of the conduit through which the rubber composition flows) as the rubber composition approaches the die opening and is expanded (e.g. an en expansion of the cross-section of the conduit through which the rubber composition flows) as it leaves the shaping die opening. In such manner, then, a rubber tire tread may be formed which contains short carbon fibers which are substantially aligned with each other in parallel manner in the longitudinal, circumferential, direction of the tread (as it appears on the tire). Such alignment of the short carbon fibers may be beneficial in a sense of being able to maximize directional stiffness of the extruded rubber composition of the tread, and thus such directional stiffness of the tread component itself.

Alternatively, said short carbon fibers may be significantly aligned (e.g. from about 10 to about 40 percent, or more, aligned which is considered herein to be significantly aligned on a relative basis, namely as compared to being randomly dispersed and not aligned altogether) with each other in the direction substantially perpendicular (e.g. from about 10 to about 30 percent of from the perpendicular in a sense of being perpendicular) to the flow of the rubber composition by an expansion extrusion of the rubber composition (extrusion of the uncured rubber composition) through a suitable shaping die. By expansion extrusion, it is meant that the volumetric flow of the rubber composition extruded through a shaping die is expanded (e.g. the cross-section of the conduit through the rubber composition flows is enlarged through which the rubber composition flows) as the rubber composition approaches the die opening and is contracted (e.g. by a reduction of the cross-section of the conduit through which the rubber composition flows) as the rubber composition leaves the die opening. In such manner, then, an extruded rubber tire tread strip may be formed which contains short carbon fibers which are somewhat aligned with each other in a somewhat perpendicular direction to the longitudinal, circumferential direction of the tread (as it appears on the tire). Such alignment of the short carbon fibers may be beneficial in the sense of the aforesaid enhancement of directional stiffness of the rubber composition of the tread and hence the directional stiffness of the tread component itself.

In practice said tire tread contains an internal (internal to the extent that it does not extend to a visible surface of the tire) base rubber composition underlying said tread cap rubber layer. In practice, the tread cap layer and underlying tread base layer are a unitary integral tread composite in the sense of being co-extruded together and subsequently sulfur cured together.

Accordingly, in practice, the individual rubber compositions of the respective zones of said zoned tread cap layer, together with said tread base rubber layer, are preferably co-extruded together to provide an integral, extruded, tread component of the tire.

In one aspect of the invention, the junctions of said primary and lateral tread cap zones are preferably positioned within circumferential grooves located between said zones.

The lateral tread cap zone(s) is intended to supplement said primary tread cap zone in a sense of promoting improved handling particularly in evasive cornering to avoid road hazards.

In practice, it is considered herein that a significant aspect of the inclusion of the coated short carbon fibers is the advantage of increasing low strain stiffness and also providing improvements in heat and electrical conductivity.

As previously discussed, the invention is directed to a tire tread of a cooperative combination of a cap/base structural configuration wherein the outer tread cap layer provides a tire running surface which is divided into a plurality of individual and strategically positioned zones which present varied and graduated physical properties.

This is a significant contrast to providing a tire tread, particularly a tread cap of a tread of cap/base construction, of a unitary tread running surface. As hereinbefore discussed, a significant difficulty of providing such a unitary tread running surface relates to compromises in providing such a tread surface with physical properties suitable for traction and/or handling over a broad range of driving conditions. By the practice of this invention of strategic positioning of selective tread cap zones across the face of the running surface of the tire tread, enhanced handling may be achieved without significant loss of wet or dry traction.

In practice, said tread base rubber layer is typically of a single rubber composition comprised of at least one conjugated diene-based elastomer such as, for example, being comprised of natural c is 1,4-polyisoprene rubber or being comprised of a blend of diene-based elastomers such as, for example, a blend of natural c is 1,4-polyisoprene rubber and cis 1,4-polybutadiene rubber. For example, the tread base rubber layer may be comprised of at least one conjugated diene-based elastomer and from about 30 to about 70 phr of rubber reinforcing filler selected from carbon black or a combination of precipitated silica and carbon black comprised of from about 30 to about 70, alternately from about 25 to about 65, phr of carbon black and optionally from about zero to about 60, alternately about 5 to about 20, phr of precipitated silica, (thus, in one aspect, the rubber reinforcing filler may be, and in general is preferably composed of rubber reinforcing carbon black).

Representative examples of conjugated diene-based elastomers for said tread base rubber layer are, for example, c is 1,4-polyisoprene rubber (usually preferably natural rubber) which may, if desired, be used in combination with another diene based elastomer such as for example, c is 1,4-polybutadiene rubber and/or isoprene/butadiene rubber.

In practice, representative examples of elastomers for said rubber compositions of said primary and lateral tread cap zones, based upon parts by weight per parts by weight rubber (phr) may be:

(A) from zero to about 100, alternately about 25 to about 100, and alternately from about 50 to about 75, phr of styrene/butadiene copolymer elastomer having a Tg in a range of from about −80° C. to about −10° C., (depending somewhat upon its bound styrene content and vinyl content of its butadiene component and whether it is produced by organic solvent solution polymerization or by aqueous emulsion polymerization of styrene and 1,3-butadiene monomers);

(B) from zero to about 80, alternately about zero to about 75, and alternately about 25 to about 50, phr of c is 1,4-polybutadiene rubber having a Tg in a range of from about −95° C. to about −110° C., preferably having a c is 1,4-content of at least 95 percent; and (C) from zero to about 40, alternately about zero to about 25, phr of at least one additional diene-based elastomer having a Tg in a range of from about −10° C. to about −100° C.

Said additional diene-based rubber may be comprised of, for example, at least one of c is 1,4-polyisoprene rubber, c is 1,4-polybutadiene rubber, isoprene/butadiene rubber, trans 1,4-polybutadiene, low vinyl polybutadiene having vinyl content in a range of 5 to about 20 percent, high vinyl polybutadiene having a vinyl content in a range of from about 20 to about 90 percent, 3,4-polyisoprene, and styrene/isoprene/butadiene rubber As hereinbefore discussed, an aspect of the invention is the inclusion of the respective tread cap zones within the rubber tread cap layer itself with the underlying and co-extruded rubber tread base itself being of a singular rubber composition and not composed of a plurality of individual zones. Thus, the individual circumferential load bearing tread cap zones extend radially inward from the tread cap running surface to the underlying, and supportive, transitional, tread base layer in contrast to extending directly to the tire carcass.

BRIEF DESCRIPTION OF THE DRAWINGS

For a further understanding of the invention, drawings are provided comprised of FIG. 1 (FIG. 1), as well as FIG. 2 and FIG. 3, as depicting a partial cross-sectional view of a cap/base configured tread portion of a pneumatic tire

THE DRAWINGS

Figure 1:
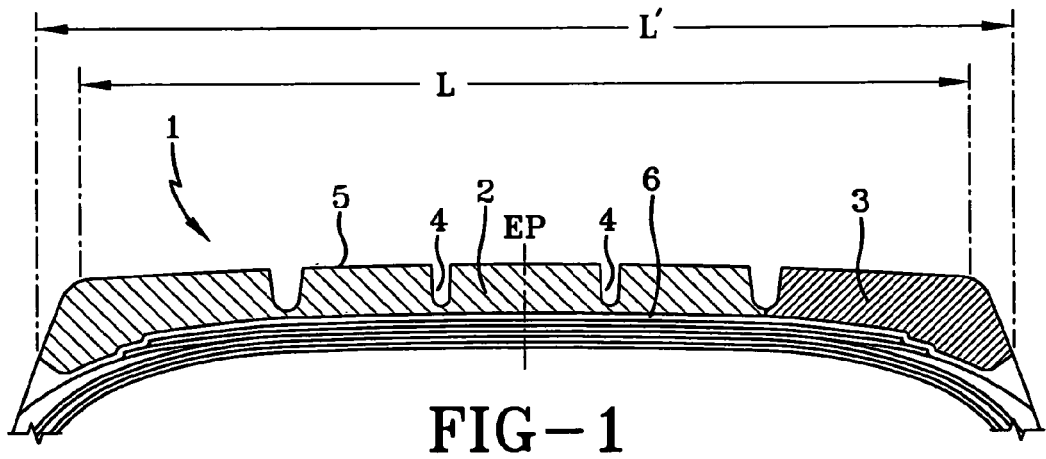

In FIG. 1 the cap/base configured tread is provided where the outer rubber tread cap layer (1) has an outer running surface (5) and a plurality of tread grooves (4). The rubber tread cap layer (1) is composed of two circumferential, longitudinal rubber zones comprised of a primary zone (2) and a minor secondary outboard zone (3) axially adjacent to said primary zone (2). The rubber tread base layer (6) is a transition zone between the tread and a tire carcass and underlies the rubber tread cap layer (1). The tread cap zones extend from the outer running surface (5) to the tread base layer (6) and are therefore designed to be load bearing where appropriate. The primary tread cap zone (2) occupies greater than 50 percent (e.g. at least 60 percent) of the span (L) of the normal free running surface of the tread which includes the span across the spaces of the openings of included grooves (4). The illustrated span (L') includes an inclusion of an additional occasional portion of the tread running surface, in addition to the normal free running surface of the tread, which may contact the ground when the tire is in a turning condition.

The divisional junction of the primary tread cap zone (1) and secondary, outboard tread zone (3) is positioned within a tread groove (4).

The rubber composition of said outboard tread cap zone (3) contains a dispersion of the preferably oriented adhesive coated short fibers according to this invention.

Figure 2:
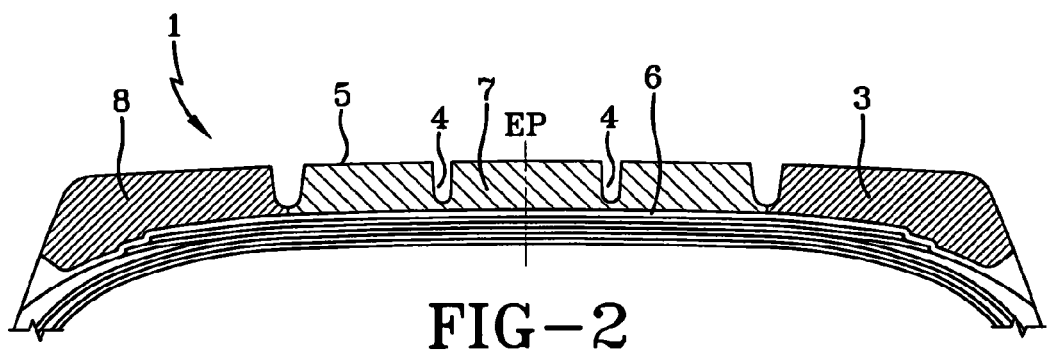

FIG. 2 is similar to FIG. 1 except that the rubber tread cap layer (1) is comprised of said primary tread zone (2) which occupies greater than 50 percent of the span (L) and two spaced apart lateral tread cap zones individually and respectively axially adjacent to each side of said primary tread cap zone (2) as an outboard lateral tread cap zone (3) and an inboard lateral tread cap zone (8), (e.g. the outboard lateral tread cap zone on one side and the inboard lateral tread cap zone on the other side of the primary tread cap zone), which are comprised of the aforesaid preferably oriented carbon fiber-rubber composition of the outboard tread cap zone (3) of FIG. 1.

Figure 3:
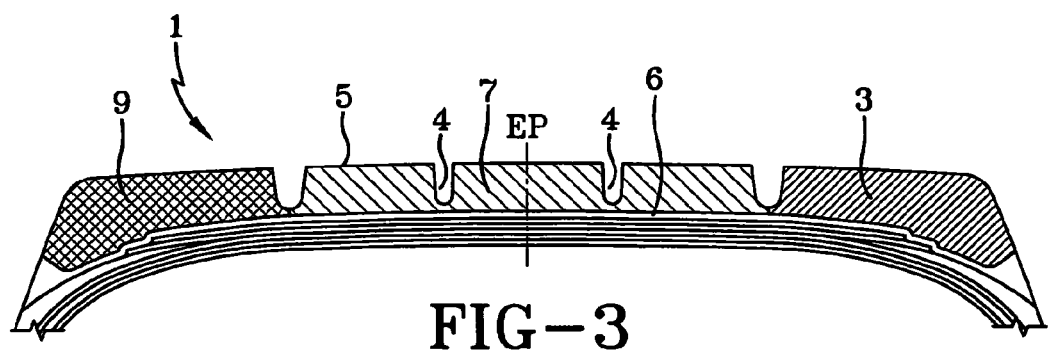

FIG. 3 is similar to FIG. 2 except that the inboard tread cap zone (9) is comprised of a rubber composition which does not contain a dispersion of adhesive coated carbon fibers and is of a different rubber composition than the rubber composition of lateral tread cap zone (7).

In the practice of this invention, the synthetic amorphous silica (e.g. precipitated silica) may be composed of aggregates of precipitated silica, which is intended to include precipitated aluminosilicates as co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm$^3$/100 g, and more usually about 100 to about 300 cm$^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of silica, particularly precipitated silicas, which can be used for elastomer reinforcement.

A coupling agent is utilized with the silica to aid in its reinforcement of the rubber composition which contains the silica. Such coupling agent conventionally contains a moiety reactive with hydroxyl groups on the silica (e.g. precipitated silica) and another and different moiety interactive with the diene hydrocarbon based elastomer.

In practice, said coupling agent may be, for example, (A) a bis-(3-triethoxysilylpropyl)polysulfide having an average of from 2 to about 4 and more preferably an average of from 2 to about 2.6 or from about 3.4 to about 4, connecting sulfur atoms in its polysulfidic bridge, or (B) a bis-(3-triethoxysilylpropyl)polysulfide having an average of from about 2 to about 2.6 connecting sulfur atoms in its polysulfidic bridge and a bis-(3-triethoxysilylpropyl) polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an organoalkoxymercaptosilane composition of the general Formula (I) represented as:

$(X)_n(R_7O)_{3-n}$—Si—$R_8$—SH  (I)

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein $R_7$ is an alkyl radical having from 1 through 18, alternately 1 through 4, carbon atoms preferably selected from methyl and ethyl radicals and more preferably an ethyl radical; wherein $R_8$ is an alkylene radical having from one to 16, preferably from one through 4, carbon atoms, preferably a propylene radical; and n is an average value of from zero through 3, preferably zero, and wherein, in such cases where n is zero or 1, $R_7$ may be the same or different for each ($R_7$O) moiety in the composition, and (D) said organalkoxyomercaptosilane of the general Formula (I) capped with a moiety which uncaps the organoalkoxymercaptosilane upon heating to an elevated temperature.

Representative examples of various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such organoalkoxymercaptosilanes may be capped with various moieties as discussed above.

A representative example of a capped organoalkoxymercaptosilane coupling agent useful for this invention is a liquid 3-octanoylthio-1-propyltriethoxysilane as NXT™ silane from the GE Silicones Company.

The coupling agent may, for example, be added directly to the elastomer mixture or may be added as a composite of precipitated silica and such coupling agent formed by treating a precipitated silica therewith or by treating a colloidal silica therewith and precipitating the resulting composite.

For example, said silica (e.g. precipitated silica), or at least a portion of said silica, may be pre-treated prior to addition to said elastomer(s):

(A) with an alkylsilane of the general Formula (II), or (B) with said bis(3-triethoxysilylpropyl)polysulfide having an average of from about 2 to about 4 connecting sulfur atoms in its polysulfidic bridge, or (C) with said organomercaptosilane of the general Formula (I), or (D) with a combination of said alkylsilane of general Formula (I) and said bis(3-triethoxysilylpropyl)polysulfide having an average of from about 2 to about 4 connecting sulfur atoms in its polysulfidic bridge, or (E) with a combination of said alkylsilane of general Formula (II) and said organomercaptosilane of general Formula (I);

wherein said alkylsilane of the general Formula (I) is represented as:

$X_n$—Si—$R_{6(4-n)}$  (II)

wherein $R_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

A significant consideration for said pre-treatment of said silica is to reduce, or eliminate, evolution of alcohol in situ within the rubber composition during the mixing of the silica with said elastomer such as may be caused, for example, by reaction of such coupling agent contained within the elastomer composition with hydroxyl groups (e.g. silanol groups) contained on the surface of the silica.

In practice, said rubber reinforcing carbon black for said rubber compositions of said tread cap zones are preferably relatively high reinforcing carbon blacks having an Iodine absorption value (ASTM D-1510) in a range of from about 110 to about 250 g/kg and a DBP adsorption value (ASTM D-2414) in a range of from about 100 to about 250 cc/100 g. Representative examples of such carbon blacks, according to their ASTM designations which may be found in *The Vanderbilt Rubber Handbook*, 13$^{th}$ Edition (1990) on Pages 416 and 417, are, for example, N110, N120, N121, N134, N220, N231, N234 and N299.

In practice, the rubber compositions may be prepared, for example, in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, and plasticizers, fillers, pigments, fatty acid, zinc oxide, waxes, antioxidants and antiozonants, peptizing agents and reinforcing materials such as, for example, carbon black and silica. As known to those skilled in the art, depending on the intended use of the sulfur vulcanizable and sulfur vulcanized material (rubbers), the additives mentioned above are selected and commonly used in conventional amounts.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. A primary accelerator(s) may be used, for example, in an amount ranging from about 0.5 to about 5, alternately about 0.8 to about 4, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, it may be, for example, be a guanidine, dithiocarbamate or thiuram compound.

The mixing of the rubber composition can, for example, be accomplished by the aforesaid sequential mixing process. For example, the ingredients may be mixed in at least one sequential non-productive (preparatory) mixing stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The following examples are presented to further illustrate the invention. The parts and percentages are by weight unless otherwise indicated.

EXAMPLE I

Samples of c is 1,4-polyisoprene rubber-based compositions were prepared which contain treated (adhesive coated) short carbon filaments (fibers). The rubber samples are referred to in this Example as Control Sample A without the treated carbon filaments and Samples B through E which contain various amounts of the treated carbon filaments. Rubber Sample E further contained an in situ formed resin of methylene acceptor (resorcinol) and methylene donor (hexamethoxymethyl melamine), with the methylene acceptor being added in the preparatory non-productive mixing step and the methylene donor being added in the final productive mixing step in order to better disperse the methylene acceptor prior to the formation of the resin in the productive mixing step.

The rubber compositions were prepared in an internal rubber mixer using two mixing stages, namely, a non-productive mix stage, in which ingredients are mixed and blended, except for sulfur curative and vulcanization accelerator(s), for about 3 to 4 minutes to a temperature of about 150 to 170° C. and the resulting mixture dumped from the mixer, sheeted out and allowed to cool to below 40° C.

The resulting rubber composition is then mixed in a productive mixing stage in an internal rubber mixer, in which sulfur curative and accelerators are added, for between about 2 and 3 minutes to a temperature of between about 100 and 120° C.

Ingredients used in the rubber Samples are illustrated in the following Table 1.

Table 1 illustrates the Basic Formulation for the rubber Samples.

TABLE 1

| (Basic Formulation | |
|---|---|
| | Parts |
| Non-Productive Mixing Step | |
| Synthetic cis 1,4-polyisoprene rubber[1] | 100 |
| Carbon black[2] | 30 |
| Rubber processing oil[3] | 5 |
| Zinc oxide | 5 |
| Fatty acid[4] | 2 |
| Antioxidant[5] | 2 |
| Resorcinol | 0 or 2 |
| Carbon fibers, (adhesive coated short filamentary fibers)[6] | 0, 1, 3 or 5 |
| Second Non-Productive Mixing Step | |
| No added ingredients | |
| Productive Mixing Step | |
| Sulfur | 1.4 |
| Accelerator[7] | 1 |
| Hexamethoxymethyl melamine | 0 or 2.5 |

[1]NAT2200 ™ from the Goodyear Tire & Rubber Company
[2]N299 rubber reinforcing carbon black, an ASTM designation
[3]Sundex 8125 ™ from Sun Oil
[4]Mixture of stearic acid, palmitic and oleic acids
[5]Quinoline type
[6]Resorcinol-formaldehyde (RFL) adhesive coated short carbon fibers derived from coating a cord of carbon fibers as T700GC ™ from Toray Industries with an hereinbefore described RFL adhesive (resorcinol, formaldehyde, latices and urea), curing and drying the adhesive, and the adhesive coated cord then chopped into short fibers having an average length of about 5 millimeters and an average diameter about 7 microns.
[7]Sulfenamide type The following Table 2 illustrates cure behavior and various physical properties of the rubber Samples. Where cured rubber samples are examined, such as for the stress-strain, rebound, hardness, tear strength and abrasion measurements, the rubber samples were cured for about 32 minutes at a temperature of about 150° C.

increase of the stiffness parameters when added to the Sample C rubber composition which also contains 3 phr of the dispersion of adhesive (RFL) coated carbon fibers (short carbon fibers). The in situ formed resin is also seen to improve cut

TABLE 2

Rubber Sample Evaluations

|  | | | Control | | |
| --- | --- | --- | --- | --- | --- |
|  | A | B | C | D | E |
| Rubber Compound (Cpd) Samples | | | | | |
| Carbon Fibers, adhesive coated | 0 | 1 | 3 | 5 | 3 |
| Rescorcinol (methylene acceptor) | 0 | 0 | 0 | 0 | 2 |
| Hexamethoxymethyl melamine (methyene donor) | 0 | 0 | 0 | 0 | 2.5 |
| Resorcinol/formadehyde in situ formed resin | 0 | 0 | 0 | 0 | 4.5 |
| Stress-strain (ATS), (cure at 150° C. for 30 minutes)[1] | | | | | |
| 100% modulus, ring (MPa) | 1.22 | 1.42 | 1.82 | 2.13 | 2.17 |
| 300% modulus, ring (MPa) | 5.73 | 5.86 | 6.41 | 6.55 | 6.73 |
| Tensile strength (MPa) | 22.5 | 20.6 | 19.2 | 17.9 | 17.1 |
| Elongation at break (%) | 607 | 583 | 557 | 542 | 530 |
| Hardness (100° C.) | 50.2 | 52.1 | 55.3 | 56.6 | 61 |
| Rebound (100° C.) | 72 | 72 | 73 | 73 | 67 |
| RPA, 100° C., 1 Hertz[2] | | | | | |
| Storage modulus (G'), 10% strain (MPa) | 0.91 | 0.93 | 0.97 | 0.94 | 1.35 |
| Tan delta, 10% strain | 0.062 | 0.065 | 0.064 | 0.064 | 0.09 |
| De Mattia Hot Wedge Pierce (cure at 150° C. for 30 minutes)[3] | | | | | |
| Length at 3 hours (mm) | 21.5 | 21.5 | 22.6 | 22.5 | 14.8 |
| Tear strength (Peel Adhesion), N, (cure at 150° C. for 30 minutes)[4] | | | | | |
| SS Average Load, 95° C. | 154.8 | 175.1 | 161.6 | 155.4 | 166.8 |
| Rheometer, (MDR), (cure at 150° C. for 30 minutes)[5] | | | | | |
| Maximum torque (dNm) | 13.6 | 13.9 | 14.1 | 14.0 | 17.2 |
| Minimum torque (dNm) | 2.0 | 2.1 | 2.2 | 2.2 | 2.3 |
| Delta torque (dNm) | 11.6 | 11.8 | 11.9 | 11.8 | 14.9 |
| T90, minutes | 12.8 | 13.2 | 12.6 | 13.2 | 11.2 |
| Holometrix (Thermal conductivity evaluation), cure at 150° C. at 30 minutes[6] | | | | | |
| K (100° C.), Watts | 0.19 | 0.19 | 0.19 | 0.21 | 0.21 |

[1]Data obtained according to Automated Testing System instrument by the Instron Corporation which incorporates six tests in one system. Such instrument may determine ultimate tensile, ultimate elongation, modulii, etc: Data reported in the Table is generated by running the ring tensile test station which is an Instron 4201 load frame.
[2]The term "RPA" refers to a Rubber Process Analyzer as RPA 2000 ™
[3]Cut growth test with a pierced length measured with time
[4]Data obtained according to a peel strength adhesion test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument. The area of contact at the interface between the rubber samples is facilitated by placement of a Mylar ™ film between the samples with a cut-out window in the film to enable the two rubber samples to contact each other following which the samples are vulcanized together and the resultant composite of the two rubber compositions used for the peel strength test.
[5]Data obtained according to Moving Die Rheometer instrument, model MDR-2000 by Alpha Technologies, used for determining cure characteristics of elastomeric materials, such as for example Torque, T90 etc.
[6]Higher values indicate increased thermal conductivity As hereinbefore pointed out, significant physical properties for the treated carbon fiber-containing rubber composition for a tire tread application are considered herein to be increased stiffness as measured by stress-strain and the data in Table 2 is reviewed with this consideration.

From Table 2 it can be seen that all of the stiffness properties are increased as the level of carbon fiber (adhesive coated short carbon fibers) added to the Control A Sample composition is increased.

This is considered herein to be significance in the sense of providing improved handling of passenger tires when the carbon fiber containing rubber compositions are positioned in the lateral tread cap zones, particularly an outboard lateral tread cap zone.

From Table 2 it can also be seen that the addition of an in situ formed adhesive resin of the methylene acceptor and methylene donor, (Sample E) provided an even greater growth resistance for the adhesive coated carbon black fiber dispersion-containing rubber composition.

EXAMPLE II

Additional samples of rubber compositions were prepared of c is 1,4-polyisoprene rubber-based compositions which contain treated (adhesive coated) short carbon filaments (fibers). The rubber samples are referred to in this Example as Control Sample F without the treated short carbon filaments and Samples G through J which contain various amounts of the treated carbon filaments.

All of the rubber compositions contained 40 phr of precipitated silica and 15 phr of rubber reinforcing carbon black.

Rubber Sample J further contained a significantly higher level of silica coupling agent.

The rubber samples were prepared and evaluated for physical properties in the manner of Example I (with a test for DIN abrasion resistance being added for this Example), using the formulation of Table 1 but with an addition of the aforesaid precipitated silica and rubber reinforcing carbon black.

The following Table 4 is representative of the basic ingredients and mixing procedure:

TABLE 4

| (Basic Formulation) | |
|---|---|
| | Parts |
| Non-Productive Mixing Step | |
| Synthetic cis 1,4-polyisoprene rubber[1] | 100 |
| Carbon black[2] | 15 |
| Rubber processing oil[3] | 6 |
| Fatty acid[4] | 2 |
| Zinc oxide | 5 |
| Silica coupler[9] | 3 |
| Antioxidant[5] | 3 or 4 |
| Carbon fibers, (adhesive (RFL) coated short filamentary fibers)[6] | 0, 1, 3 or 5 |

TABLE 4-continued

| (Basic Formulation) | |
|---|---|
| | Parts |
| Additional Sequential Non-Productive Mixing Step | |
| Precipitated silica[8] | 20 |
| Silica coupler[9] | 2 or 5 |
| Rubber processing oil[10] | 3 |
| Productive Mixing Step | |
| Sulfur | 1.4 |
| Accelerator[7] | 1.7 |

[8]Precipitated silica as HiSil210 ™ from PPG Industries
[9]Silcia coupler as X266S ™ from Degussa as a 50/50 composite of carbon black and bis(3-triethoxysilylpropyl)polysulfide containing an average in a range of from about 2.4 to about 2.8 connecting sulfur atoms in its polysulfidic bridge
[10]Rubber processing oil as "Flexon 641 ™ from ExxonMobile The following Table 5 illustrates cure behavior and various physical properties of the rubber Samples.

TABLE 5

| Rubber Sample Evaluations | | | | | |
|---|---|---|---|---|---|
| | Control | | | | |
| | F | G | H | I | J |
| Rubber Compound (Cpd) Samples | | | | | |
| Carbon Fibers, adhesive coated | 0 | 1 | 3 | 5 | 3 |
| Precipitated silica | 40 | 40 | 40 | 40 | 40 |
| Silica coupler (Sample J with higher level) | 5 | 5 | 5 | 5 | 8 |
| Carbon black | 15 | 15 | 15 | 15 | 15 |
| Stress-strain (ATS), (cure at 150° C. for 30 minutes)[1] | | | | | |
| 100% modulus, ring (MPa) | 1.81 | 1.96 | 2.46 | 2.81 | 2.73 |
| 300% modulus, ring (MPa) | 9.03 | 8.73 | 9.13 | 9.24 | 10.37 |
| Tensile strength (MPa) | 21.97 | 19.7 | 17.87 | 17.04 | 18.79 |
| Elongation at break (%) | 572 | 545 | 504 | 491 | 491 |
| Hardness (100° C.) | 62.9 | 63.2 | 65.7 | 67.9 | 67.2 |
| Rebound (100° C.) | 62.7 | 62.7 | 63.4 | 63 | 64 |
| RPA, 100° C., 10% strain, 1 Hertz[2] | | | | | |
| Storage modulus (G'), (MPa) | 1.74 | 1.67 | 1.68 | 1.8 | 1.92 |
| Tan delta• | 0.101 | 0.11 | 0.123 | 0.103 | 0.094 |
| Tear strength (Peel Adhesion), N, (cure at 150° C. for 30 minutes)[4] | | | | | |
| SS Average Load, 95° C. | 147.3 | 152.6 | 93.4 | 112.3 | 54.8 |
| Rheometer, (MDR), (cure at 150° C. for 30 minutes)[5] | | | | | |
| Maximum torque (dNm) | 22.8 | 22.4 | 23.1 | 23.2 | 24.2 |
| Minimum torque (dNm) | 3.4 | 3.0 | 3.5 | 3.7 | 3.4 |
| Delta torque (dNm) | 19.4 | 19.4 | 19.6 | 19.5 | 20.8 |
| T90, minutes | 14.1 | 14.4 | 13.2 | 13.0 | 15.7 |
| DIN Abrasion[7] | | | | | |
| Relative volume loss, cc | 145 | 149 | 170 | 182 | 159 |

The tests for the indicated footnotes 1, 2, 4 and 5 are found in Example I following Table 2.

[7]Data obtained according to DIN 53516 abrasion resistance test procedure using a Zwick drum abrasion unit, Model 6102 with 2.5 Newtons force. DIN standards are German test standards. The DIN abrasion results are reported as relative values to a control rubber composition used by the laboratory. Lower values indicate improved abrasion resistance.

From Table 4 it can be seen that the addition of increasing levels of the dispersion of carbon fibers (short carbon fibers) dispersed within a silica/carbon black reinforced rubber composition give a similar increase of stiffness values (Samples G through J) as shown when rubber reinforcing carbon black was used without the presence of the precipitated silica from Example I.

This is considered herein to be significant in the sense of the ability to improve not only carbon black reinforced rubber compositions but also silica reinforced rubber compositions which is considered to be particularly important for tread rubber compositions.

From Table 4 it can also be seen that the addition of silane coupling agent, particularly at increased levels (Sample 3) provides not only higher stiffness when compared to Sample H with the same level of carbon fiber content but also improved abrasion resistance as compared to Sample H.

EXAMPLE III

A tire of size P225/60R16 is prepared having a tread of a cap/base construction with the tread cap layer providing a running surface of the tire and composed of asymmetrical primary and supplemental (lateral) circumferential longitudinal zones in a manner similar to FIG. 1.

The primary tread cap layer spans about 75 percent of total running surface of the tire tread and the lateral tread cap zone spans the remaining 25 percent of the total running surface of the tire tread and joins the primary tread cap zone layer within a tread groove.

The outboard lateral tread cap zone rubber contains a dispersion of RFL coated short carbon fibers.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a rubber tread of a cap/base construction comprised of an outer rubber tread cap layer containing an outer running surface and an underlying internal rubber tread base layer, wherein said tread cap layer is comprised of a plurality of circumferential, longitudinal rubber tread cap zones, wherein said tread cap zones individually extend from said tread cap running surface radially inward to said tread base layer:

wherein said tread cap zones are comprised of a primary, inboard, tread cap zone, and two spaced apart lateral tread cap zones, wherein each lateral tread cap zone is individually respectively positioned axially adjacent to each side of said primary tread cap zone;

wherein said primary, inboard, tread cap zone spans from about 60 to about 90 percent of the axial width of the total running surface of said tire tread cap layer, and wherein said lateral tread cap zones span the remaining axial width of the total running surface of said tire tread cap layer;

wherein said primary, inboard, tread cap zone is of a rubber composition, which does not contain a dispersion of adhesive coated carbon fibers, comprised of:
 (1) at least one conjugated diene-based elastomer, and
 (2) about 30 to about 130 phr of reinforcing filler consisting of about 10 to about 120 phr of precipitated silica and up to about 120 phr of rubber reinforcing carbon black, and coupling agent for said precipitated silica having a moiety reactive with hydroxyl groups contained on the surface of said silica and another different moiety interactive with said diene-based elastomer; and wherein said lateral cap zones are of the same or different rubber compositions comprised of:
 (3) at least one conjugated diene-based elastomer,
 (4) about 1 to about 5 phr of a dispersion therein of adhesive coated short carbon fibers,
 (5) about 20 to about 100 phr of reinforcing filler consisting of rubber reinforcing carbon black, wherein said short carbon fibers have an average length within a range of from about 1 to about 10 millimeters and an average diameter within a range of from about 2 to about 15 microns; and wherein said carbon fibers are significantly aligned with each other in the direction substantially perpendicular of the flow of the rubber composition by extrusion of the rubber composition through a die, wherein said carbon fibers have an RFL adhesive coating thereon comprised of a resorcinol-formaldehyde resin and polymeric binder, wherein said polymeric binder is comprised of vinylpyridine/styrene/butadiene terpolymer and acrylonitrile/butadiene copolymer, and optionally urea.

2. The tire of claim 1 wherein the rubber composition of at least one of said lateral tread cap zones contains an in situ formed resin consisting of a product of a methylene donor and methylene acceptor.

3. The tire of claim 2 wherein said methylene donor is comprised of at least one of hexamethoxymethyl melamine and hexamethylenetetramine and said methylene acceptor is comprised of at least one of resorcinol, resorcinolic derivatives and novolak resins.

4. The tire of claim 2 where said methylene donor is comprised of hexamethoxymethyl melamine and methylene acceptor is comprised of resorcinol.

5. The tire of claim 2 wherein said carbon fibers and methylene acceptor are mixed with the rubber composition prior to mixing the methylene donor upon which the methylene donor/methylene acceptor resin is formed in situ within the rubber composition in the presence of the RFL adhesive coated carbon fiber dispersion.

6. The tire of claim 1 wherein said tread cap layer and said underlying tread base layer are a unitary integral tread composite in the sense of being co-extruded together and subsequently sulfur cured together.

* * * * *